United States Patent [19]

Sekmakas et al.

[11] 4,260,730
[45] Apr. 7, 1981

[54] PREPARATION OF BISPHENOL-FORMALDEHYDE ETHERS USING NITRIC ACID

[75] Inventors: Kazys Sekmakas, Palatine; Thomas H. Plaisance, Wilmette, both of Ill.

[73] Assignee: DeSoto, Inc., Des Plaines, Ill.

[21] Appl. No.: 109,215

[22] Filed: Jan. 3, 1980

Related U.S. Application Data

[63] Continuation-in-part of Ser. No. 5,192, Jan. 22, 1979, abandoned.

[51] Int. Cl.$^3$ .............................................. C08G 2/34
[52] U.S. Cl. .............................. 528/145; 204/14 R; 204/181 C; 260/29.3; 525/504; 528/147; 528/153; 568/608; 568/609
[58] Field of Search ....................... 528/145, 147, 153; 525/504; 568/608, 609

[56] References Cited

U.S. PATENT DOCUMENTS

| | | | |
|---|---|---|---|
| 3,220,964 | 11/1965 | Giller | 260/19 |
| 4,182,732 | 1/1980 | Fry | 528/147 X |

OTHER PUBLICATIONS

Chem. Abstracts, vol. 63, 1965, 18397f-g, Taniewski et al.
Chem. Abstracts, vol. 59, 1963, 14200f-g, Okamura et al.
Chem. Abstracts, vol. 84, 1976, 107172u, Hitachi Co.
Chem. Abstracts, vol. 34, 1940, 3402$^9$-3403$^1$, Albert.

*Primary Examiner*—Howard E. Schain
*Attorney, Agent, or Firm*—Dressler, Goldsmith, Shore, Sutker & Milnamow, Ltd.

[57] ABSTRACT

A bisphenol is reacted with formaldehyde in solution in alcohol in the presence of an alkali metal hydroxide, preferably at a pH of from 7-10, to provide a polymethylol derivative. Nitric acid is then added to precipitate the hydroxide and an excess is preferably used to provide an acid pH, preferably pH 1-3, and the acidic mixture is heat reacted to remove water of etherification. The nitric acid catalyst is then precipitated with alkali metal hydroxide to enable easy removal of both acid and alkali as an insoluble salt.

14 Claims, No Drawings

PREPARATION OF BISPHENOL-FORMALDEHYDE ETHERS USING NITRIC ACID

DESCRIPTION

This application is a continuation-in-part of our prior application Ser. No. 5,192 filed Jan. 22, 1979, now abandoned.

TECHNICAL FIELD

The present invention relates to the production of ethers of bisphenol-formaldehyde. The problem is to obtain a good yield of product while minimizing the formation of polymers so as to produce eithers which are water dispersible. Also, it is desired to provide a product which is largely free of contaminating salts in an easy and effective manner. These salts ionize in an aqueous medium which would interfere with the use of the products in electrocoating. Excess acidic or basic ions are particularly troublesome and must be avoided.

BACKGROUND ART

The production of bisphenol-formaldehyde condensates and the production of ethers therefrom is described in Polish patent No. 48,971 to Michal Taniewski et al., but our attempts to follow the process taught in this patent did not produce a satisfactory product in good yield.

DISCLOSURE OF INVENTION

In accordance with this invention, a bisphenol is reacted with formaldehyde in solution in alcohol in the presence of an alkali metal hydroxide. Small amounts of the hydroxide are preferred to minimize cost, and ease subsequent filtration, so while larger amounts may be present, it is a feature of this invention to employ only catalytic amounts of the hydroxide which provides a pH of from 7-10. This reaction provides a polymethylol derivative (a tetramethylol derivative if methylolation is complete). Nitric acid is then added to precipitate the hydroxide and an acid pH is provided, preferably by adding excess nitric acid to provide a pH in the range pH 1-3. The proportion of alcohol is preferably in stoichiometric excess, and the acidic mixture is heat reacted to remove the water of etherification, normally as an azeotrope with some of the excess alcohol. This is particularly effective with the $C_4$ and higher alkanols. When the desired etherification has been obtained (at least one and preferably at least two methylol groups are etherified), excess alcohol is distilled off, desirably to a solids content of 60% to 80%, and the nitric acid catalyst is reacted with alkali metal hydroxide which precipitates the nitrate so it can be easily removed, as by filtration, to provide a bisphenol-formaldehyde ether in the substantial absence of contaminating salts and unneutralized ions.

For best results, the trace of unreacted hydroxide or nitric acid which remains is removed. Ion exchange or similar treatment can be used for this purpose, but this adds to the cost of the process. In preferred practice, the precipitate-free product is analyzed, and the trace of excess acid or base is removed by precipitation with added alkali metal hydroxide or nitric acid followed by removal of the precipitate. This multistage precipitation and filtration can more accurately remove the conductive ions which interfere with best results in the electrocoating process.

This invention is particularly adapted to provide products which are extensively methylolated, as by the presence of from 2 to 4 methylol groups per molecule. Also, etherification is desirably extensive, as indicated by the presence of from 2 to 4 etherified methylol groups per molecule.

It is desired to stress that the essence of this invention is the selection of nitric acid to precipitate the alkali metal hydroxide, and also, in preferred practice, to provide the etherification catalyst. No equivalent for nitric acid is known. Sulfuric acid, for unknown reason, causes excessive molecular weight during etherification and it forms a water soluble salt which complicates the process.

This process has several important features. First, the nitric acid causes etherification in good yield and with minimal undesired polymerization. Second, it is particularly easy to remove the nitric acid because, in the alcohol medium, it forms a precipitate with alkali metals. In this way the nitric acid etherification catalyst is removed and, at the same time, the alkali metal used to catalyze the first stage methylolation reaction is also removed. Third, the etherification reaction is more precisely controllable when using butanol or higher alkanol because, as compared with $C_1-C_3$ alkanols, the water of etherification if far less soluble, and hence is more easily removed. Surprisingly, the resulting butylated resin is dispersible in water in the presence of a polymer salt. Normally, when melamine-formaldehyde is etherified, butanol cannot be used because the ether is not dispersible in water containing polymer salt.

The bisphenol reactants have the formula:

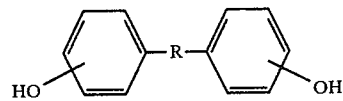

In the preferred bisphenol, the two phenolic OH groups are in the para position. R identifies a divalent aliphatic hydrocarbon group. The preferred compound is bisphenol A which has the formula:

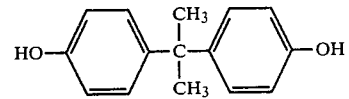

The formaldehyde reactant can be provided in various forms, e.g., as a solution in alcohol, but it is conveniently supplied as paraformaldehyde which dissolves in the alcoholic medium during the adduction with the bisphenol. The formaldehyde is used in an amount of at least 2 moles per mole of the bisphenol, but it is preferably used in stoichiometric excess based on the reactive positions on the bisphenol. A 5%-50% stoichiometric excess is preferred, and the unreacted formaldehyde distills off with the alcohol and water.

Any alcohol may be used, but $C_1-C_8$ alkanols, preferably a $C_4-C_8$ alkanol, and most particularly a butanol which may be either n-butanol or isobutanol in preferred practice.

The alkali metal hydroxide is preferably sodium hydroxide, but potassium hydroxide can be used and will further illustrate the useful class of materials.

The methylolation reaction is a simple one and is itself well known. The reactants in alcoholic medium are simply heated in the presence of the alkali metal hydroxide and a small amount of water, and the adduction reaction proceeds easily and quickly. In normal practice 110° C. for 2 hours provides substantially complete methylolation to the tetramethylol derivative, but lower temperatures are also useful.

The etherification reaction is also well known by itself, being facilitated by moderate heat (80° C.-150° C.) and by the removal of the water of reaction.

BEST MODE FOR CARRYING OUT THE INVENTION

EXAMPLE 1

| Grams | Component |
|---|---|
| 800 | Bisphenol A |
| 520 | Paraformaldehyde |
| 1800 | Butanol |
| | Charge into reactor. Set reflux condenser and start agitation. Then add the following: |
| 3 | Sodium hydroxide |
| 3 | Deionized water |
| | Heat to 110° C. and hold for 2 hours. Cool to 35° C. and add the following slowly to the reactor over 10 minutes: |
| 8 | Nitric Acid (70%) |
| 24 | Butanol |

Set empty trap to collect water. Heat to 110° C. and collect 200 grams of water. Then cool to 80° C. Set vacuum pump to remove butanol. Distill off 1428 grams of butanol. Start cooling to 60° C. Then add 390 grams of isopropanol and filter using a filter aid.

The product is a solution having a solids content of 73.6%, a viscosity (Gardner) of V, and a Gardner-Holdt color of 3-4. It is dispersible in water containing dissolved carboxyl-functional copolymer salt with an amine. It is also dispersible in water containing dissolved amine-functional copolymer salt with a solubilizing acid.

EXAMPLE 2

Superior and more consistent performance is obtained by subjecting the solution of Example 1 to ion exchange to remove residual ions, but this ion exchange step can be eliminated by testing the filtered product in Example 1 to determine whether there is any residual unreacted acidic or basic ions. One can expect to find traces of one or the other, so these can be accurately noted and neutralized to provide a small additional precipitate which is removed by filtration using an uncontaminated filter aid.

It is desired to point out that the ethers of this invention convert the water soluble polymethylol derivatives into relatively water insoluble condensates. This allows them to become associated with acidic or amine-functional resins which are dispersed in water by salt formation (as is well known) so as to be electrodeposited with the resin salt. The butyl and higher ethers are surprisingly stable in water dispersion, as previously pointed out, and the higher boiling alcohol produces better flow out when deposited films are baked. Thus, these resins are useful for the curing of reactive resins, especially those which are to be applied from aqueous medium, and while the application to a substrate can be by diverse means, electrodeposition is particularly advantageous. However, the present invention relates to the production of the resins and to the resins which are formed.

What is claimed is:

1. A method for the production of bisphenol-formaldehyde ethers comprising reacting a bisphenol with at least 2 moles of formaldehyde per mol of said bisphenol, the reaction being carried out in solution in alcohol in the presence of an alkali metal hydroxide to provide a polymethylol derivative of said bisphenol, adding nitric acid to precipitate said hydroxide, and then heat reacting said polymethylol derivative alcohol solution at an acid pH while removing water of etherification.

2. A method as recited in claim 1 in which said alcohol is present in stoichiometric excess and said alkali metal hydroxide is used in small amount to provide a pH of from 7-10.

3. A method as recited in claim 2 in which said excess alcohol is distilled off after water of etherification has been removed to provide a solids content of from 60% to 80%.

4. A method as recited in claim 1 in which said formaldehyde is used in a 5% to 50% stoichiometric excess.

5. A method as recited in each of claim 1-4 in which said alkali metal hydroxide is sodium hydroxide.

6. A method as recited in claim 1 in which said alcohol is a $C_1$-$C_8$ alkanol.

7. A method as recited in each of claims 1-4 in which nitric acid is used to provide a pH of 1-3 for the said etherification reaction.

8. A method as recited in claim 7 in which said nitric acid catalyst is removed when the etherification reaction has been completed by precipitating the nitric acid with alkali metal hydroxide, and then removing the precipitate.

9. A method as recited in claim 1 in which said polymethylol derivative contains from 2-4 methylol groups per molecule.

10. A method as recited in claim 9 in which said etherification reaction is carried out to provide from 2-4 etherified methylol groups per molecule.

11. A method as recited in each of claims 1-4 in which said alcohol is a butanol.

12. A method for the production of bisphenol-formaldehyde ethers comprising reacting bisphenol A with a 5% to 50% stoichiometric excess of formaldehyde in solution in excess $C_4$-$C_8$ alkanol in the presence of an alkali metal hydroxide at a pH of from 7-10 to provide a polymethylol derivative of said bisphenol A, adding nitric acid to provide a pH of 1-3, heat reacting the acidic mixture while removing water of etherification, precipitating the nitric acid with alkali metal hydroxide when the etherification reaction has been completed, and then removing the precipitate.

13. A method as recited in claim 8 in which the precipitate-free product is tested for residual unneutralized alkali metal hydroxide or nitric acid, and the trace of either which remains is removed by precipitation with alkali metal hydroxide or nitric acid followed by removal of the precipitate.

14. A method as recited is claim 12 in which the alkanol is a butanol.

* * * * *